March 25, 1952     D. L. KESSLER ET AL     2,590,182
V BELT POWER TRANSMISSION SYSTEM
Filed July 27, 1950
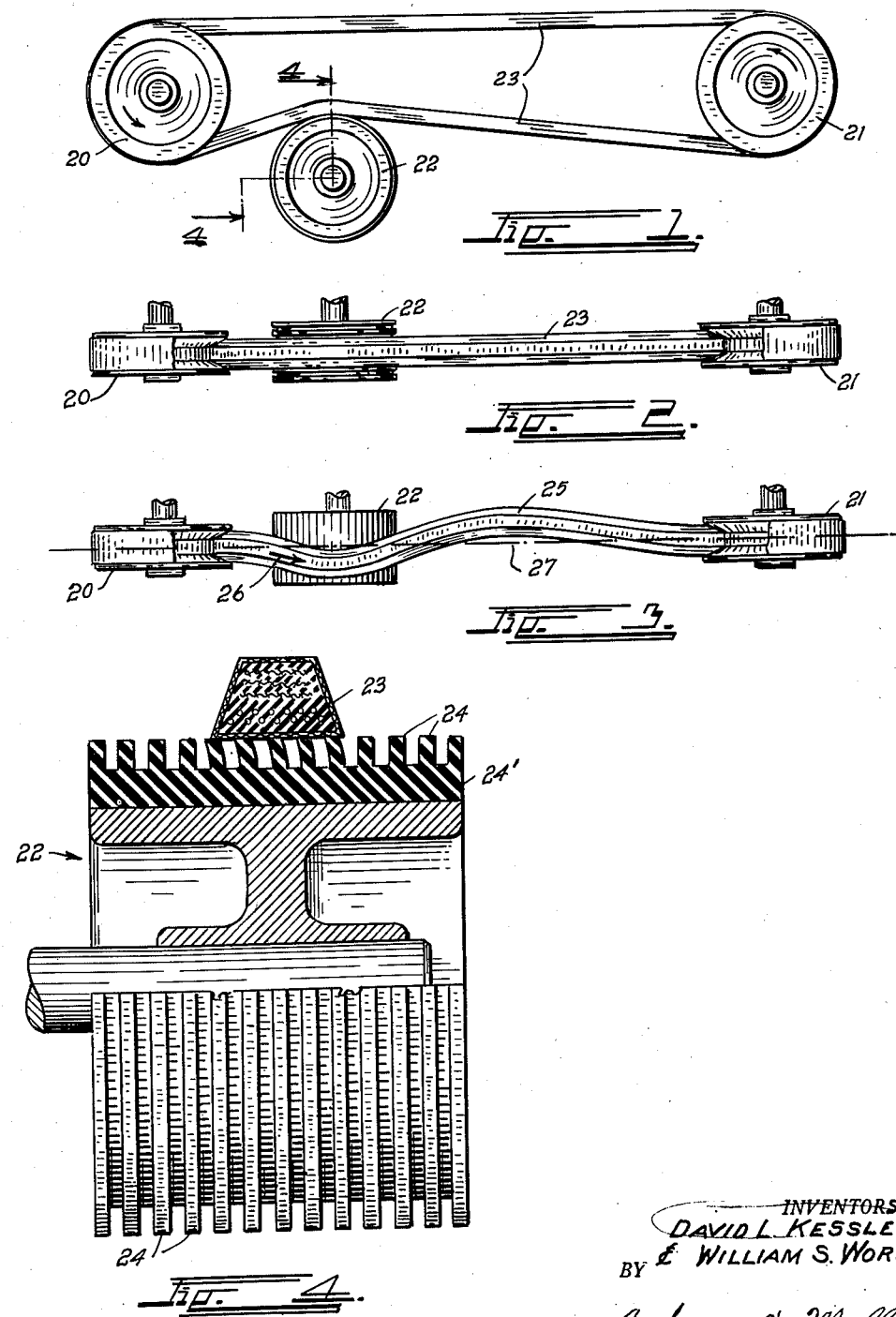
INVENTORS
DAVID L. KESSLER
& WILLIAM S. WORLEY.
BY
Anderson & Muller
ATTORNEYS.

Patented Mar. 25, 1952

2,590,182

UNITED STATES PATENT OFFICE 2,590,182

V BELT POWER TRANSMISSION SYSTEM

David L. Kessler and William S. Worley, Denver, Colo., assignors to The Gates Rubber Company, Denver, Colo., a corporation of Colorado Application July 27, 1950, Serial No. 176,156

6 Claims. (Cl. 74—221)

This invention relates to improvements in V-belt power transmission systems and more particularly to systems which employ a V-belt, or multiple V-belts, trained between two sheaves and employing a novel idler pulley therebetween. This invention is also associated with the subject matter disclosed in copending application, Serial No. 106,708 filed July 25, 1949, now Patent No. 2,548,135, dated April 10, 1951.

In certain types of V-belt power transmission systems it is common practice to employ an idler pulley between the drive and driven sheaves over which the belt is trained, the outside or wide side of the belt engaging the idler pulley. In certain of these transmission systems, especially where there is a considerable distance between sheaves, the "slack" side of the belt often develops a lateral vibration between the sheaves which in some cases is so severe that the belt will jump one of the sheaves. In multiple V-belt drives this vibration often causes a belt to swing between an adjacent belt and the sheave, which results in cutting or tearing one or more of the belts from the transmission system. Additionally, even where the belt or belts do not jump the pulleys, excessive vibration is present in the transmission system which, of course, is objectionable, and the belt or belts wear excessively due both to misaligned tracking over the idler pulley and misaligned movement of the belt or belts onto or from the sheaves.

The principal object of the present invention is to provide a V-belt transmission system of the type employing an idler pulley in which the belt travels between sheaves without lateral vibration.

Another object is to provide a novel idler pulley which may be employed with conventional sheaves and V-belts which minimizes lateral vibrations of the belts.

Another object is to provide an idler pulley having its outer surface so constructed that a belt always tracks onto the pulley in a direction normal to the axis of rotation of the pulley.

A further object is to provide an idler pulley of the foregoing type in which the pulley surface is provided with a material of appropriate modulus over which the flat outer surface of a V-belt is trained.

Still further objects, advantages and salient features will become more apparent from the description to follow, the appended claims, and the accompanying drawing, in which:

Figure 1 is a side elevation of a conventional pulley system and belt in which is employed the novel idler pulley which forms the subject of the invention;

Figure 2 is a top plan thereof, the upper run of the belt being broken away;

Figure 3 is a view similar to Figure 2 which illustrates lateral belt vibration when a conventional flat face idler pulley is employed in the sheave system of Figures 1 and 2; and Figure 4 is an enlarged cross section taken on line 4—4, Figure 1.

Referring in detail to the drawing, V-sheave 20 is the driver and V-sheave 21 the driven, these being supported by any suitable shafts, or the like. Idler pulley 22 is similarly supported and is disposed between sheaves 20, 21 in a manner such that the outer or wide surface of the belt engages pulley 22, as best shown in Figures 1 and 4.

Belt 23 may be of any conventional construction with a flat outer side but the pulley 22 differs from the conventional flat face pulley in that its outer surface is provided with resilient means having an appropriate modulus, this means being illustrated as a rubber covering 24' having a plurality of parallel ribs 24 which serve a purpose to presently be described.

In Figure 3 is shown a conventional V-belt with a flat outer surface, the curvature of the belt illustrating one position thereof during lateral vibration, this vibration being started by a gust of wind on the belt, striking the belt with an object, lack of rigidity in the drive system, or other cause. It has been found that lateral displacement of the belt between idler 22 and sheave 21, say at midspan point 25, causes the belt to track onto the idler in an opposite direction as indicated by arrow 26, that is, out of parallelism with a line 27 between the sheave centers. This causes the belt to swing back with increased velocity producing further misaligned tracking until equilibrium is reached, at which time, the belt is vibrating laterally at a certain critical amplitude and frequency which may, for example, be the natural frequency of vibration of the belt. The cause of this vibration has been found to be excited by the misaligned tracking of the belt onto the idler pulley. It has also been found that when the belt tracks in alignment, that is, with arrow 26 parallel to line 27, between the pulleys, the vibration is eliminated entirely or minimized.

In the identified copending application are disclosed certain types of belts which have ribs, or the like, on the wide surface of the belt which produce proper tracking of the belt onto the idler pulley and thus eliminate or minimize the lateral vibration. It has been found that the ribs, or other material of appropriate modulus, need not be on the belt, but may be disposed on the idler pulley instead, and still achieve the same results.

In Figure 4 the idler pulley is shown with a plurality of parallel rubber ribs 24, these being so spaced that the belt at all times contacts at least two ribs, and of such size and resilience that they tend to bend slightly, somewhat as shown exaggerated, at the area of contact between the flat side of the belt and the ribs, when there is a force which tends to start any lateral vibration of the belt. The tendency to distort the belt, when there is a force which tends to vibrate it, is transferred to these ribs, at the area of contact, so that the belt tracks onto the idler pulley straight, that is, with arrow 26 in alignment with line 27. As previously explained, since the direction of tracking is aligned with the straight line movement of the belt between sheaves, the exciting force which effects cumulative increase of vibration is eliminated.

Many modifications will become apparent within the purview of the invention, which is not to be limited to the exemplary structure, except as defined by the scope and spirit of the appended claims.

Having described the invention, what is claimed as new is:

1. A power transmission system comprising; a drive V-sheave, a driven V-sheave, a V-belt connecting the sheaves in a manner such that the drive sheave transmits its power to the driven sheave, an idler pulley disposed between the sheaves having a circular belt contacting surface engaging the outer wide side of the belt, the idler pulley having resilient means adjacent its belt contacting surface extending peripherally thereabout of appropriate modulus of elasticity and shape to cause the belt to track onto the idler pulley in a plane perpendicular to its axis of rotation, the resilient means being constructed and operable to eliminate any substantial lateral vibration of the belt between the idler pulley and the driven sheave.

2. A power transmission system in accordance with claim 1 wherein the resilient means is a rubber-like material which tends to distort in a direction parallel to the axis of rotation of the idler pulley, at the area of contact between the belt and idler pulley, under the influence of belt contact.

3. A power transmission in accordance with claim 1 wherein the resilient means includes rib means adapted to contact the belt at spaced areas on the belt.

4. In a power transmission system of the type wherein a drive V-sheave is connected to a driven V-sheave by a V-belt, the drive sheave transmitting its power to the driven sheave, and an idler pulley having a circular belt contacting surface which engages the wide side of the belt is disposed between the drive and driven sheaves, the improvement which comprises; resilient means adjacent the belt contacting surface of the idler pulley extending peripherally thereabout of appropriate modulus of elasticity and shape to cause the belt to track onto the idler pulley in a plane perpendicular to its axis of rotation, the resilient means being constructed and operable to eliminate any substantial lateral vibration of the belt between the idler pulley and the driven sheave.

5. An idler pulley in accordance with claim 4 wherein the resilient means is a rubber-like material which tends to distort in a direction parallel to the axis of rotation of the idler pulley, at the area of contact between the belt and idler pulley, under the influence of belt contact.

6. An idler pulley in accordance with claim 4 wherein the resilient means includes rib means adapted to contact the belt at spaced areas on the belt.

DAVID L. KESSLER.
WILLIAM S. WORLEY.

REFERENCES CITED

The following references are of record in the file of this patent:

UNITED STATES PATENTS

| Number | Name | Date |
| --- | --- | --- |
| 1,394,328 | Miller | Oct. 18, 1921 |
| 2,067,400 | Koplin et al. | Jan. 12, 1937 |
| 2,073,668 | Wilson | Mar. 16, 1937 |
| 2,484,752 | Searles | Oct. 11, 1949 |